US012811779B2

(12) United States Patent
von Liechtenstein

(10) Patent No.: US 12,811,779 B2
(45) Date of Patent: Nov. 24, 2026

(54) HYBRID POST-QUANTUM TLS MIGRATION WITH BINDER-ENFORCED RESUMPTION

(71) Applicant: Maximilian Ralph Peter von Liechtenstein, Concord, MA (US)

(72) Inventor: Maximilian Ralph Peter von Liechtenstein, Concord, MA (US)

( * ) Notice: Subject to any disclaimer, the term of this patent is extended or adjusted under 35 U.S.C. 154(b) by 0 days.

(21) Appl. No.: 19/309,197

(22) Filed: Aug. 25, 2025

(65) Prior Publication Data

US 2026/0052009 A1 Feb. 19, 2026

(51) Int. Cl.
*H04L 9/08* (2006.01)
*H04L 9/06* (2006.01)
*H04L 9/32* (2006.01)

(52) U.S. Cl.
CPC .......... *H04L 9/0838* (2013.01); *H04L 9/0631* (2013.01); *H04L 9/3297* (2013.01)

(58) Field of Classification Search
CPC ..... H04L 9/0838; H04L 9/0631; H04L 9/088; H04L 9/0891; H04L 9/0897; H04L 9/3247; H04L 9/3268; H04L 9/3297
USPC .......................................................... 713/171
See application file for complete search history.

(56) References Cited

U.S. PATENT DOCUMENTS 6,874,089 B2 * 3/2005 Dick .................... H04L 69/329 380/278
9,591,084 B1 3/2017 Egorov
10,069,800 B2 9/2018 Lu
10,554,689 B2 2/2020 Reddy
10,581,948 B2 3/2020 Goel
11,374,975 B2 6/2022 Gray
11,405,369 B1 8/2022 Retyunskiy
11,863,669 B2 * 1/2024 Seaborn ................ H04L 9/0869
12,184,627 B2 * 12/2024 Bartelt ...................... H04L 9/14

(Continued)

OTHER PUBLICATIONS

Rescorla, Eric, "The Transport Layer Security (TLS) Protocol Version 1.3," Request for Comments (RFC) 8446, Aug. 2018, pp. All, vol./Issue: RFC 8446, RFC Editor / Internet Engineering Task Force (IETF), USA.

(Continued)

*Primary Examiner* — Amare F Tabor

(57) ABSTRACT

A system and method for secure transport resumption during post-quantum migration. A server negotiates a handshake and issues a session ticket embedding scope metadata that identifies a key-exchange class (e.g., hybrid post-quantum and classical, or classical), and may include a schema version, service-identity scope, policy flags, a rollout epoch, and a site identifier. On a subsequent connection the client presents the ticket with a resumption binder. The server selects an expected binder class from the scope metadata, verifies the binder using a pre-shared key derived for the selected class, and accepts or refuses resumption accordingly. Binding resumption to the negotiated class mitigates cross-class replay and downgrade while remaining compatible with classical endpoints and middleboxes. Optional embodiments include certificate-transparency enforcement via policy flags, point-of-presence scoping, epoch-based rollout and rollback, and hardware-security-module-gated key activation with quorum approval and attestation. The approach enables black-box verifiability and incremental, standards-conformant deployment.

10 Claims, 7 Drawing Sheets

(56) References Cited

U.S. PATENT DOCUMENTS

| | | | | |
|---|---|---|---|---|
| 12,192,184 | B2 * | 1/2025 | Nix | H04L 63/045 |
| 12,676,880 | B1 * | 7/2026 | Collison | H04L 63/1441 |
| 2018/0316724 | A1 | 11/2018 | Reddy | |
| 2019/0182349 | A1 | 6/2019 | Goel | |
| 2022/0006835 | A1 | 1/2022 | Gray | |

OTHER PUBLICATIONS

Salowey, John; Cam-Winget, Nancy; Kelly, Sean; Nir, Maor, "Transport Layer Security (TLS) Session Resumption without Server-Side State," Request for Comments (RFC) 5077, Jan. 2008, pp. All, vol./Issue: RFC 5077, RFC Editor / IETF, USA.

Krawczyk, Hugo, "HMAC-based Extract-and-Expand Key Derivation Function (HKDF)," Request for Comments (RFC) 5869, May 2010, pp. All, vol./Issue: RFC 5869, RFC Editor / IETF, USA.

Laurie, Ben; Langley, Adam; Kasper, Emil, "Certificate Transparency," Request for Comments (RFC) 6962, Jun. 2013, pp. All, vol./Issue: RFC 6962, RFC Editor / IETF, USA.

Iyengar, Jana; Thomson, Martin, "QUIC: A UDP-Based Multiplexed and Secure Transport," Request for Comments (RFC) 9000, May 2021, pp. All, vol./Issue: RFC 9000, RFC Editor / IETF, USA.

Thomson, Martin; Turner, Sean, "Using TLS to Secure QUIC," Request for Comments (RFC) 9001, May 2021, pp. All, vol./Issue: RFC 9001, RFC Editor / IETF, USA.

National Institute of Standards and Technology (NIST), "Guidelines for the Selection, Configuration, and Use of Transport Layer Security (TLS) Implementations," NIST Special Publication 800-52 Revision 2, Aug. 2019, pp. All, vol./Issue: SP 800-52r2, U.S. Department of Commerce, Gaithersburg, MD, USA.

National Institute of Standards and Technology (NIST), "Recommendation for Key-Derivation Methods in Key-Establishment Schemes," NIST Special Publication 800-56C Revision 2, Jul. 2020, pp. All, vol./Issue: SP 800-56C Rev. 2, U.S. Department of Commerce, Gaithersburg, MD, USA.

National Institute of Standards and Technology (NIST), "Module-Lattice-Based Key-Encapsulation Mechanism (ML-KEM)," Federal Information Processing Standards Publication (FIPS) 203, 2024, pp. All, vol./Issue: FIPS 203, U.S. Department of Commerce, Gaithersburg, MD, USA.

National Institute of Standards and Technology (NIST), "Module-Lattice-Based Digital Signature Standard (ML-DSA)," Federal Information Processing Standards Publication (FIPS) 204, 2024, pp. All, vol./Issue: FIPS 204, U.S. Department of Commerce, Gaithersburg, MD, USA.

IETF TLS Working Group, "Hybrid Key Exchange in TLS 1.3," IETF Internet-Draft (work in progress), 2024, pp. All, vol./Issue: n/a, Internet Engineering Task Force (IETF), USA.

Google LLC (Chromium Project), "Certificate Transparency Policy," Chromium Project Web Documentation, 2023, pp. n/a, vol./Issue: n/a, Google LLC, Mountain View, CA, USA.

Cloudflare, Inc, "The TLS Post-Quantum Experiment," Cloudflare Blog, 2022, pp. n/a, vol./Issue: n/a, Cloudflare, Inc., San Francisco, CA, USA.

Google LLC (Boringssl), "ssl.h (TLS 1.3 notes)," Boringssl Developer Documentation (Web), 2020, pp. n/a, vol./Issue: n/a, Google LLC, Mountain View, CA, USA.

* cited by examiner

HYBRID POST-QUANTUM TLS MIGRATION WITH BINDER-ENFORCED RESUMPTION

CROSS-REFERENCE TO RELATED APPLICATIONS

None.

STATEMENT REGARDING FEDERALLY SPONSORED RESEARCH OR DEVELOPMENT

None.

INCORPORATION BY REFERENCE

The contents of any publications cited herein are incorporated by reference to the extent permitted by 37 C.F.R. § 1.57, without admitting they are prior art.

FIELD OF THE INVENTION

The disclosure relates to cryptographic communications and public-key infrastructure, particularly to mechanisms for introducing post-quantum cryptography (PQC) into TLS 1.3 at scale.

BACKGROUND

TLS 1.3 and enterprise PKI are widely deployed using classical elliptic-curve cryptography. The standardization of PQC algorithms requires staged rollouts that preserve performance, compatibility, and auditability. Hybrid key establishment, dual-algorithm certificate chains, session resumption, certificate transparency (CT), and hardware security module (HSM) key rotation are operationally interdependent. Conventional approaches either disable resumption across PQ/non-PQ edges, causing latency regressions, or isolate PQ deployments, limiting coverage.

There is a need for concrete internals that: (i) bind PQ key-exchange context into TLS resumption tickets; (ii) enable resumption across middleboxes while detecting downgrade; (iii) manage dual-algorithm certificate chains with CT logging: (iv) rotate split keys across HSM clusters under quorum and attestation: and (v) export privacy-preserving telemetry evidencing PQ usage.

PRIOR ART

TLS 1.3 session resumption and binders: RFC 8446 defines pre-shared key (PSK) resumption using binders that authenticate the ClientHello to the original handshake transcript. The standard prescribes binder semantics but does not prescribe server-internal policy for cross-device resumption, ticket scope semantics, or downgrade resistance across heterogeneous capability domains.

Session tickets across load balancers: Operational literature describes cross-device resumption by sharing ticket-encryption keys among front-ends, and highlights secure ticket-key rotation. Prior deployments focus on ticket-key distribution rather than embedding explicit scope metadata or conditioning resumption on antecedent post-quantum negotiation.

Hybrid key exchange for TLS 1.3: IETF drafts specify constructions for combining a classical ECDHE with a PQ KEM to derive traffic secrets. These drafts do not describe resumption-ticket structures that carry a post-quantum-specific binder or policy metadata for cross-middlebox resumption.

Dual-algorithm certificates and certificate transparency: CT logging (SCTs) and PQ/T hybrid certificates are documented, but coordinated issuance and stapling policy that selects SCTs per client capability within a unified resumption-aware rollout policy is not prescribed.

HSM rotation, attestation, and quorum: HSM documentation and patents discuss key rotation, multi-party control, and remote attestation as building blocks: they do not teach atomic sealed-handle updates gated jointly by attestation and quorum in concert with TLS resumption policy and telemetry gates.

Academic work on resumption and 0-RTT characterizes security and ticket management, but does not provide deployment-level guidance for post-quantum-aware binder contexts or downgrade-aware scope semantics.

DISTINCTIONS OVER PRIOR ART

PQ-context binder and scope metadata in tickets: The resumption ticket includes (i) a binder computed over at least the KEM transcript and server-certificate context, and (ii) authenticated scope metadata (identity domain and key-schedule version) enabling cross-middlebox resumption while enforcing downgrade refusal when antecedent PQ negotiation is absent.

Branching verification logic: Resumption is conditioned on whether the antecedent handshake negotiated the PQ KEM, validating a PQ binder in that case and otherwise validating a legacy binder.

Coordinated CT and dual-chain policy: A certificate manager submits precertificates to PQ-capable and classical CT logs, stores returned SCTs, and a policy controller selects SCT stapling per client capability, integrated with resumption behavior and error budgets.

Attestation- and quorum-gated atomic key rotation: An HSM cluster performs split-key rotation only upon successful remote attestation and M-of-N quorum approval, atomically updating sealed handles exposed to TLS terminators and rolling back upon failure, with audit logging; this operates in lock-step with the resumption-policy version indicated by ticket scope.

Telemetry-gated rollout: Transition from shadow→allow→require is gated by measured binder success rates by type and downgrade detections, providing verifiable migration evidence.

BRIEF SUMMARY

In one aspect, a method negotiates a hybrid TLS 1.3 handshake deriving traffic secrets from both a classical key share and a PQ key encapsulation mechanism (KEM), issues a resumption ticket containing a PQ context binder and a legacy binder, and resumes by validating the PQ binder when PQ was negotiated and the legacy binder otherwise.

In another aspect, a certificate lifecycle manager issues dual-algorithm certificate chains and submits corresponding precertificates to certificate transparency logs (PQ-capable and classical), storing signed certificate timestamps (SCTs).

In another aspect, an HSM cluster rotates split keys under remote attestation and quorum approval, atomically updating sealed key handles exposed to TLS terminators. Telemetry indicates PQ rollout coverage and resumption behavior without exposing secrets.

Devices, systems, and machine-readable media implementing the above are disclosed.

DETAILED DESCRIPTION—TERMINOLOGY

As used herein: "hybrid handshake" denotes a key schedule that derives traffic secrets from both a classical ephemeral key agreement (e.g., ECDHE) and a PQ KEM: "binder" denotes an authenticated tag associated with TLS 1.3 resumption: "dual-algorithm chain" denotes a certificate chain carrying two signature algorithms for a subject: "split-key rotation" denotes replacement of key parts across an HSM cluster under quorum and attestation.

Figure 1:
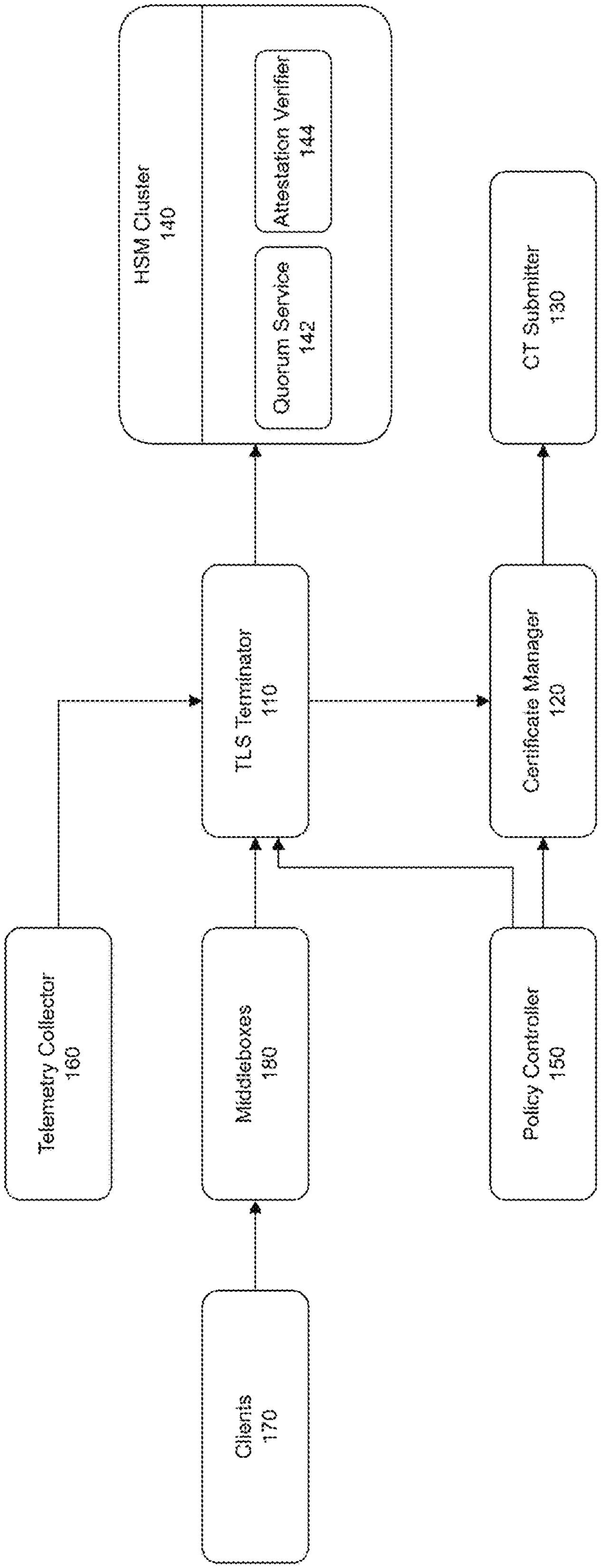
FIG. 1 illustrates an architecture for hybrid PQ-TLS migration.

System Architecture (FIG. 1)

A migration system 100 comprises a TLS terminator 110 (proxy or load-balancer), a certificate lifecycle manager 120, a CT submission service 130, an HSM cluster 140 with quorum service 142 and attestation verifier 144, a policy controller 150, and a telemetry collector 160. Clients 170 communicate over networks potentially traversing middleboxes 180. The components may be implemented in software, hardware, or any combination thereof.

FIG. 1 is a block diagram of an architecture for hybrid PQ-TLS migration.

Figure 2:
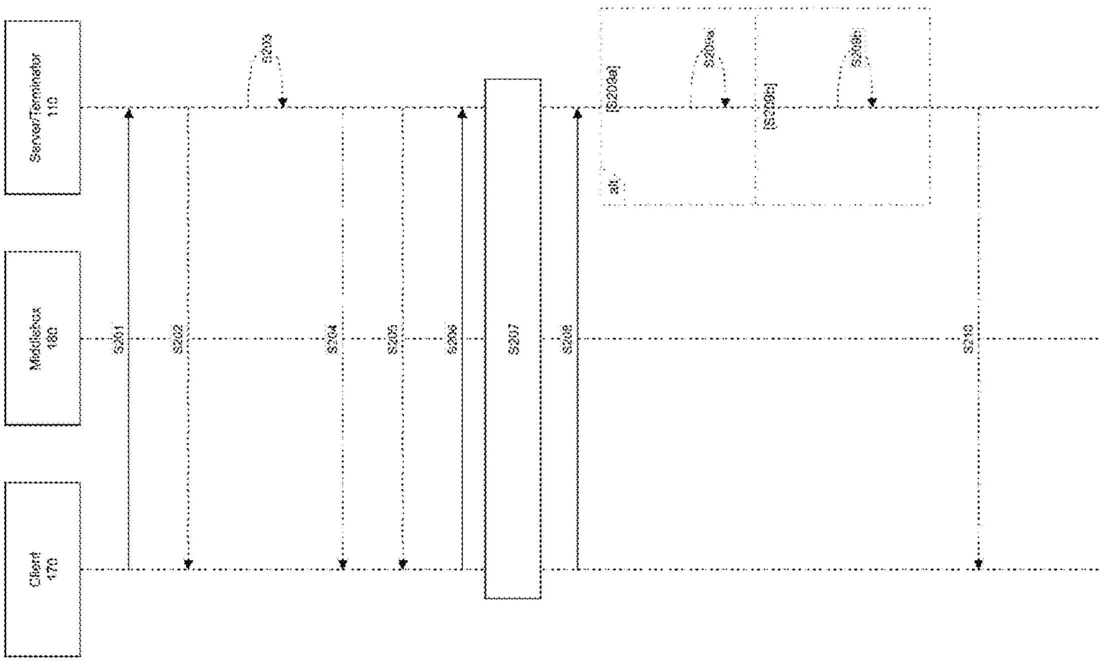
FIG. 2 illustrates a hybrid TLS 1.3 handshake with PQ binder and resumption across middleboxes.

Hybrid Handshake and Resumption (FIG. 2)

The terminator 110 advertises hybrid capability. During handshake, the client and server exchange (i) a classical key share and (ii) a PQ KEM encapsulation. The key schedule derives traffic secrets from both inputs if available. The server issues a resumption ticket that includes: (a) a PQ context binder computed over at least the KEM transcript and optionally server-certificate context, (b) a legacy PSK binder, and (c) scope metadata (identity domain, key-schedule version).

Upon resumption, the server validates the PQ binder if PQ was negotiated in the antecedent handshake, or the legacy binder otherwise. Tickets may be scoped to enable resumption across administrative domains or middleboxes while detecting unauthorized downgrade. Ticket keys may be shared among terminators to permit cross-device resumption while maintaining binder verification.

FIG. 2 is a sequence diagram illustrating a hybrid TLS 1.3 handshake and session resumption.

Figure 3:
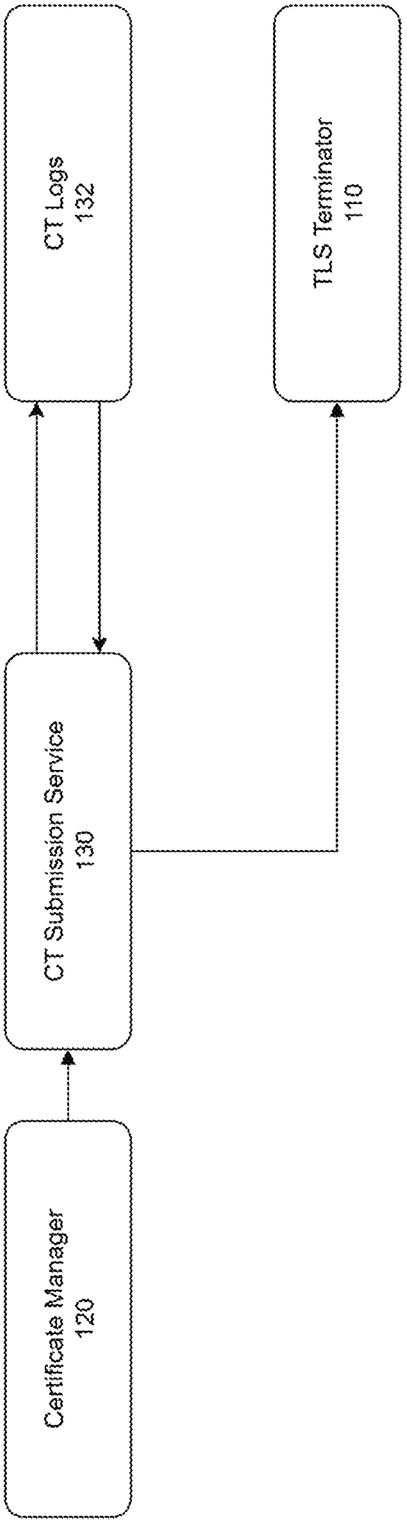
FIG. 3 illustrates a certificate lifecycle with dual-algorithm chains and CT logging.

Dual-Algorithm Certificates and CT (FIG. 3)

The certificate lifecycle manager 120 issues certificates with both a classical and a PQ signature, installs chains on the terminator 110, and submits precertificates to CT logs. PQ-capable CT logs are used for PQ extensions; classical logs may be used for compatibility. Returned SCTs are stored and delivered in TLS. Rollout policy modes include shadow, allow, and require, driven by capability telemetry and error budgets.

FIG. 3 is a block diagram illustrating dual-algorithm certificates and certificate-transparency (CT) interactions.

Figure 4:
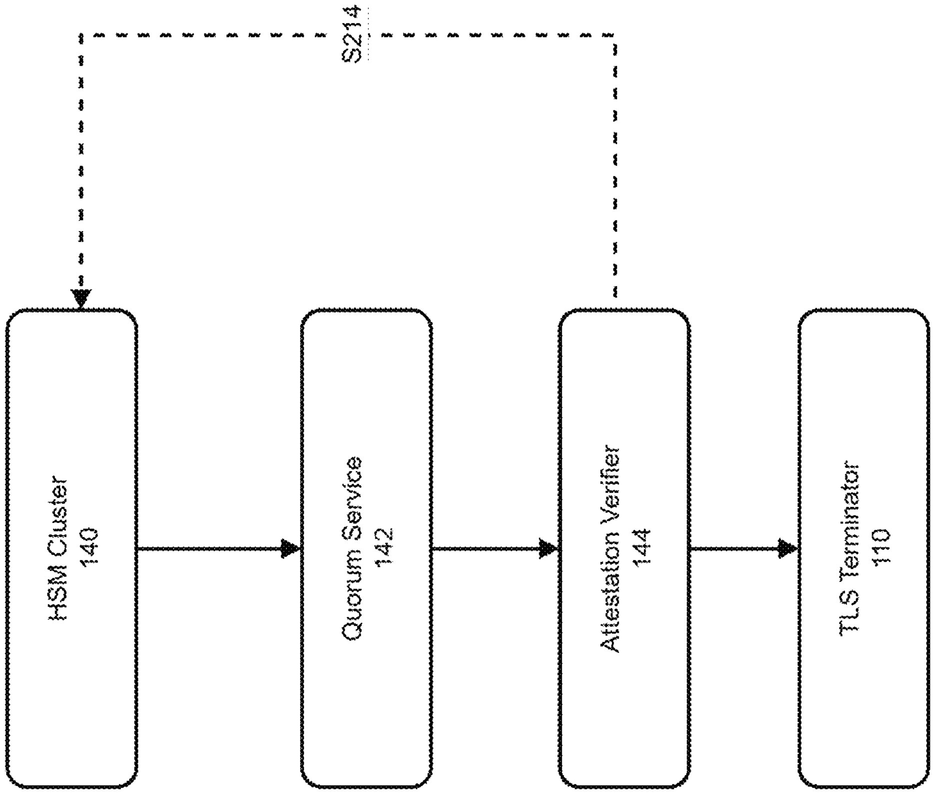
FIG. 4 illustrates HSM split-key rotation with quorum and attestation.

HSM Split-Key Rotation and Attestation (FIG. 4)

The HSM cluster 140 stores split private keys for classical and PQ identities. Rotation comprises: (i) generating new shards; (ii) verifying each HSM by remote attestation; (iii) obtaining quorum approval; and (iv) atomically updating sealed key handles consumed by the terminator 110. Failure of attestation or quorum triggers rollback without exposing prior keys. An append-only audit log records events.

FIG. 4 is a block diagram illustrating HSM split-key rotation with quorum approval and remote attestation.

Figure 5:
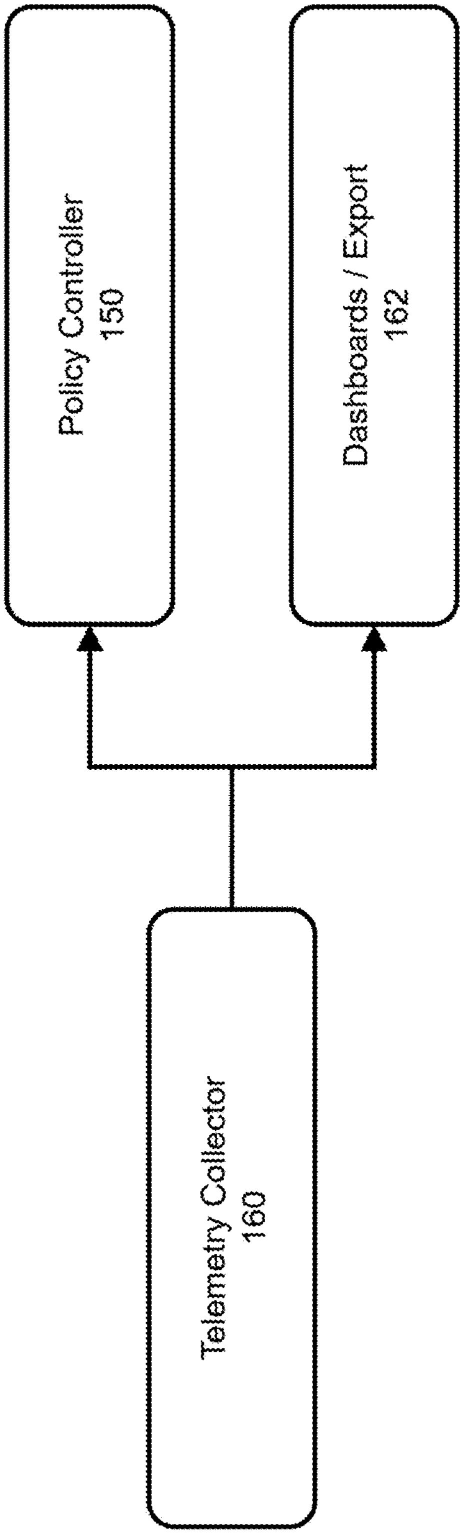
FIG. 5 illustrates telemetry and policy flows.

Telemetry and Rollout Policy (FIG. 5)

The telemetry collector 160 aggregates counters such as hybrid-handshake ratio, resumption success broken down by binder type, CT submission status, HSM rotation events, and attestation outcomes. Data are anonymized or aggregated to avoid disclosure of keys or client identities.

FIG. 5 is a block diagram of telemetry capture and rollout policy components.

Embodiments and Alternatives

Preferred embodiments utilize BoringSSL or OpenSSL with PQ KEM support, Envoy/NGINX as the terminator, PKCS #11 or cloud KMS drivers for HSM, and a policy controller enforcing staged rollout. Alternative embodiments include hardware offload for binder computation, CT submission via message queue, or integration within a CDN edge framework.

Novelty and Advantages

The disclosed mechanisms provide deployability internals not prescribed by standards: binding PQ KEM context into resumption tickets with cross-middlebox scope control; coordinated dual-algorithm chain issuance with CT logistics; and atomic split-key rotation under attestation and quorum, with telemetry proving PQ coverage. These combinations enable at-scale PQ migration without breaking resumption, PKI/CT, or HSM operations.

List of Reference Numerals

100—Migration system (overall architecture comprising components 110-180).

110—TLS terminator (proxy/load balancer/CDN edge implementing hybrid handshake and resumption ticket logic).

120—Certificate lifecycle manager (issuance/renewal of dual-algorithm certificate chains and policy).

130—Certificate-transparency (CT) submission service (submits precertificates to PQ-capable and classical logs: stores SCTs).

140—Hardware security module (HSM) cluster (stores split keys; enforces cryptographic operations).

142—Quorum service (collects approvals for key rotation and sensitive operations; enforces M-of-N policy).

144—Attestation verifier (verifies remote-attestation evidence from HSMs/TEEs before key updates).

150—Policy controller (staged rollout, downgrade policy, and feature flags for PQ enablement).

160—Telemetry collector (aggregates privacy-preserving counters for PQ adoption and system health).

170—Clients (browsers, apps, devices initiating TLS 1.3 connections).

180—Middleboxes (non-terminating intermediaries such as DDOS shields, L4/L7 load-balancers, CDNs, and NATs).

Component Embodiments by Reference Numeral

System 100—Preferred: horizontally scaled microservices where 110-160 run as containerized services on an edge/region cluster with mutual TLS and mesh policy. Alternatives: (a) single-appliance deployment with 140 external:(b) cloud-native split where 120/130 are managed CA/CT and 110 runs in a CDN edge; (c) air-gapped variant with offline CT aggregation.

TLS terminator 110—Preferred: Envoy/NGINX with BoringSSL/OpenSSL supporting ML-KEM: issues tickets carrying a PQ binder and a legacy binder: enforces scope (domain, key-schedule version) for cross-LB resumption with downgrade prevention. Alternatives: SmartNIC/DPDK offload; kTLS path; hardware KEM accelerator; CDN edge module sharing ticket keys across PoPs.

Certificate lifecycle manager 120—Preferred: ACME-compatible CA issuing dual-algorithm chains per subject and aligning classical/PQ validity windows. Alternatives: enterprise CA plugin; public CA API: internal subordinate CA with cross-sign: per-service profiles driven by 150.

CT submission service 130—Preferred: submits precerts to PQ-capable and classical logs: stores SCTs; retries with backoff; signs a publish manifest. Alternatives: broker to multiple log operators: third-party CT monitor: offline queue for restricted networks.

HSM cluster 140—Preferred: FIPS 140-3 L3 cluster storing split keys and exposing scaled handles to 110; rotation via atomic update APIs and wrap/unwrap under hardware-rooted keys. Alternatives: cloud KMS: TEE-backed software HSM; threshold/MPC service.

Quorum service 142—Preferred: M-of-N approvals using hardware tokens or FIDO authenticators: produces a signed quorum record embedded in audit log. Alternatives: IAM-integrated workflow: time-lock+dual-control: policy-as-code tied to change tickets.

Attestation verifier 144—Preferred: validates SPDM/TPM/TEE evidence per trust policy before accepting new shards. Alternatives: vendor attestation APIs; DAA for privacy; external attestation service with transparency log.

Policy controller 150—Preferred: staged rollout shadow→allow→require, downgrade rules, kill-switches: exposes configuration to 110/120. Alternatives: signed static bundles; SaaS control plane: feature-flag system gating on SLO/error budgets.

Telemetry collector 160—Preferred: OpenTelemetry/Prometheus exporting hybrid ratio, binder success by type, CT status, rotation events, attestation outcomes; privacy via aggregation/anonymization. Alternatives: syslog/ELK; proprietary telemetry; offline export.

Clients 170—Preferred: modern browsers and app SDKs supporting hybrid KEM and dual-chain validation. Alternatives: legacy classical-only clients (server validates legacy binder); embedded/IoT stacks: service-mesh mTLS clients.

Middleboxes 180—Preferred: non-terminating L4/L7 LBs, DDOS shields, CDNs, NATs: tickets with scope enable cross-device resumption without disabling downgrade protections. Alternatives: TLS-terminating corporate proxies (supported if ends coordinate ticket keys and policy); QUIC/L4 LBs requiring consistent hashing for stickiness.

No Admission of Prior Art

Any discussion of publications, standards, systems, or techniques herein is provided for background and does not constitute an admission that such material is prior art under 35 U.S.C. § 102 or otherwise.

Claim Construction and Definitions

As used herein, "comprising" is inclusive and open-ended: "configured to" describes capability and not intent: "or/and-or" includes any combination: "at least one of A, B, or C" means any of A, B, or C and any combination thereof unless context dictates otherwise.

No element is intended to invoke 35 U.S.C. § 112 (f) absent the explicit phrase "means for" or "step for."

Computing Environment

Implementations may execute on one or more processors, memory subsystems, persistent storage, and network interfaces coupled via one or more interconnects.

Deployment models include bare-metal servers, virtual machines, containers, SmartNIC/DPDK offload, or trusted execution environments (TEEs).

Non-transitory machine-readable media include magnetic, optical, flash, and solid-state devices storing instructions that, when executed, cause a system to perform disclosed methods.

Threat Model and Security Assumptions

Middleboxes 180 are non-terminating and may steer or reorder flows: ticket keys may be shared across devices; clients 170 may be PQ-capable or classical only.

An adversary may attempt downgrade from PQ to classical, cross-context ticket replay, or binder mix-up.

Mitigations include a PQ-context binder computed over KEM transcript and server-certificate context, authenticated scope metadata (identity domain and key-schedule version), refusal of resumption upon downgrade, and audit/telemetry to detect anomalies.

Figure 6:
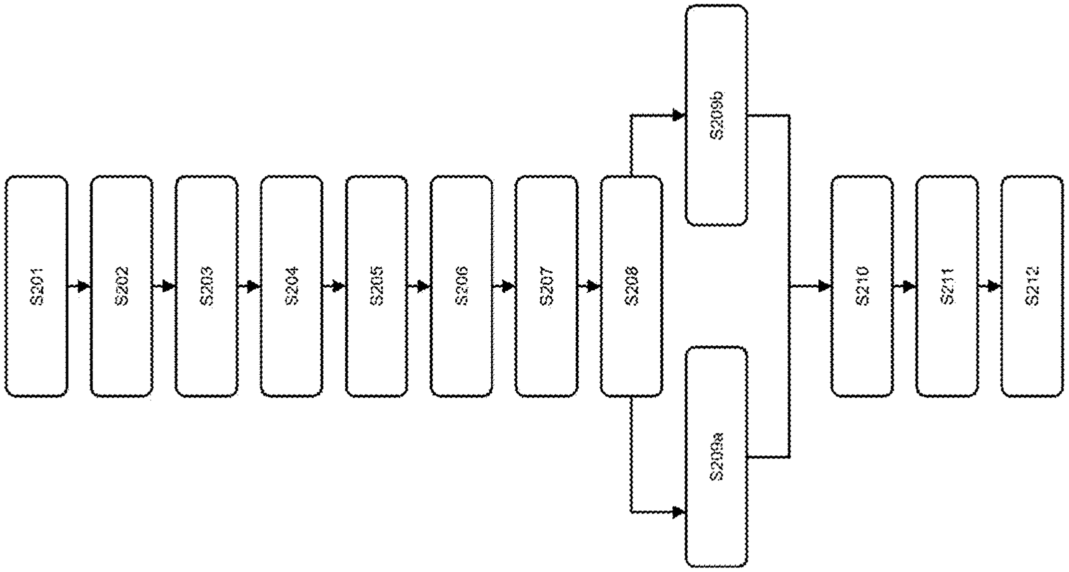
FIG. 6 illustrates an exemplary flow chart (steps S201-S212) implementing the method of claim 1.
Figure 7:
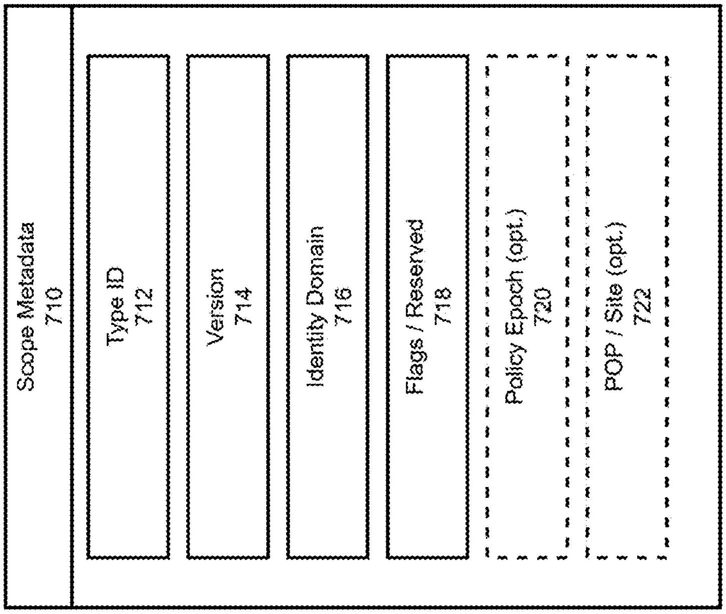
FIG. 7 illustrates variants of the method flow and an exemplary scope-metadata layout for resumption tickets.

Method Flow (FIGS. 6-7)

An exemplary flow implements claim 1 as steps S201-S212: S201 advertise hybrid capability; S202 negotiate classical key share and PQ KEM; S203 derive hybrid secrets; S204 compute a PQ-context binder over at least the KEM transcript and server-certificate context: S205 compute a legacy PSK binder; S206 generate a resumption ticket containing authenticated scope metadata (identity domain and key-schedule version); S207 receive a resumption request; S208 determine whether an antecedent handshake negotiated the PQ KEM; S209 validate the PQ binder when negotiated and otherwise validate the legacy binder; S210 refuse resumption upon detection of downgrade: S211 permit cross-device resumption where ticket keys are shared; S212 record audit and telemetry events.

Variants include scope metadata that additionally encodes site/POP or policy epoch; disjoint binder contexts to prevent cross-acceptance: and defensive key schedules during ticket-key rotation.

FIG. 6 is a flowchart of an example method for binder-enforced resumption and policy rollback.

FIG. 7 is a schematic of ticket scope-metadata fields.

Representative Use Cases

CDN edge: anycast POP-to-POP resumption with PQ offered results in acceptance; suppression of PQ results in refusal, demonstrating branching verification and downgrade refusal.

Enterprise load balancer: resumption across two devices using shared ticket keys; certificate chain includes both classical and PQ signatures; SCT stapling selected per client capability.

Service-mesh mTLS: internal gRPC using hybrid mTLS: telemetry gates migration stages from shadow to allow to require.

Best Mode (Non-Limiting)

TLS terminator 110 uses Envoy with BoringSSL supporting ML-KEM-768: certificates combine ECDSA P-256 and a PQ signature: NewSessionTicket carries a scope extension {domain, key-schedule version}: the PQ-context binder is an HMAC over {KEM transcript||certificate context||scope}; HSM cluster 140 enforces M-of-N quorum 142 and attestation 144; CT submissions target both PQ-capable and classical logs with policy-driven SCT stapling.

Standards Mapping (Non-Limiting)

The PQ-context binder aligns with TLS 1.3 resumption binder mechanisms but is computed over PQ-specific transcript elements: scope metadata is carried in a NewSession Ticket extension: downgrade refusal triggers when Supported Groups or KeyShare omit the antecedent PQ KEM.

References to field names or extensions are exemplary and non-limiting.

Performance and Operational Notes

Resumption across devices maintains 0-RTT/1-RTT latency benefits while enforcing PQ provenance; binder computation adds negligible overhead compared to KEM operations.

Ticket-key rotation schedules may be decoupled from certificate rollover: telemetry confirms PQ coverage and downgrade detections.

Industrial Applicability

The techniques apply to public websites. CDNs, enterprise gateways. VPN concentrators, and service-mesh infrastructures undergoing PQC migration.

Acronyms

CT—Certificate Transparency; HSM—Hardware Security Module; KEM—Key Encapsulation Mechanism; LB—Load Balancer; PQ—Post-Quantum: PQC—Post-Quantum Cryptography: PSK—Pre-Shared Key: SCT—Signed Certificate Timestamp; TEE—Trusted Execution Environment; TLS—Transport Layer Security.

Additional Embodiments and Implementation Details

Definitions

As used herein. "hybrid key exchange" denotes a TLS handshake in which both a classical ephemeral key agreement and a post-quantum key encapsulation mechanism contribute cryptographic material to the traffic-secret derivation. "Binder-enforced resumption" refers to a resumption flow that rejects session tickets unless a resumption binder corresponding to the negotiated key exchange class is verified. "Scope metadata" is structured context bound to a session ticket that identifies the negotiation scope (e.g., key-exchange type, policy epoch, and point-of-presence) and is authenticated by the ticket protection key. "Quorum approval" denotes a multi-party authorization step in which a threshold of administrators approves protected key operations in a hardware security module (HSM) cluster. "Remote attestation" refers to validation of attestation evidence produced by an HSM or secure enclave, proving that key material is operated under an approved firmware and policy state.

System Components (Overview)

A TLS terminator (110) services clients (170) and interposes with network middleboxes (180). A certificate manager (120) issues and rotates dual-algorithm certificate chains and submits precertificates to a certificate-transparency (CT) submitter (130) for logging to CT logs (132). An HSM cluster (140) provides key storage and cryptographic operations; a quorum service (142) mediates key-rotation approval and an attestation verifier (144) validates device state prior to sensitive operations. A policy controller (150) disseminates rollout rules to the TLS terminator (110) and to the certificate manager (120). A telemetry collector (160) aggregates handshake result metrics and exposes dashboards/export (162).

Implementation Details—Ticket Format and Binder Semantics

In a preferred embodiment, the TLS terminator (110) issues a session ticket containing (i) a random opaque ticket identifier. (ii) an AEAD-protected payload with scope metadata (710), and (iii) one or more resumption PSK binders. The protected payload includes at least: Type ID (712) indicating the negotiated key-exchange class (e.g., HYBRID, CLASSICAL); Version (714) indicating the payload schema; Identity Domain (716) specifying the terminator identity scope (e.g., certificate hash or service cluster id); Flags/Reserved (718) for forward-compatibility: optionally Policy Epoch (720) to couple resumption to a rollout epoch; and optionally POP/Site (722) to constrain tickets geographically. The TLS terminator derives distinct resumption PSK secrets for classical and hybrid handshakes. On resumption, the server selects the validation path based on the stored Type ID (712), verifying the post-quantum binder when the handshake included a post-quantum KEM, or the classical binder otherwise. Tickets presented with a binder inconsistent with Type ID (712) are refused to prevent downgrade and cross-context replay.

Implementation Details—Certificate Manager and CT Submission

The certificate manager (120) manages dual-algorithm chains (e.g., ECDSA+ML-DSA) and coordinates precertificate issuance. Upon rotation events or policy changes, the manager submits precertificates to the CT submitter (130), which then posts to multiple CT logs (132) and collects signed certificate timestamps (SCTs). The TLS terminator (110) staples SCTs during handshake and records telemetry for CT acceptance rates. Failures trigger policy fallback via the policy controller (150).

HSM Cluster Operations

Keys used for ticket protection and certificate signing reside in the HSM cluster (140). Rotation is gated by quorum service (142) policy; a rotation proposal specifies key identifiers, algorithm sets, effective dates, and rollback windows. Before activation, attestation verifier (144) validates evidence (e.g., measurement registers, firmware identifiers, and policy digests). If attestation fails, the system defers activation and raises an alarm. In a failure event, sealed prior key handles are restored and rotation is rolled back without exposing prior key material, with a signed audit trail emitted to telemetry (160) and dashboards (162).

Policy Controller and Rollout

The policy controller (150) distributes rules to the TLS terminator (110) and certificate manager (120), including: (a) per-POP enablement of hybrid handshakes, (b) minimum PQ security levels, (c) ticket lifetimes per scope, and (d) fallback behavior for incompatible clients (170) and middleboxes (180). Policy epochs are monotonically increasing identifiers stored in scope metadata (720) to ensure deterministic rollback and auditability across distributed sites (722).

Telemetry Schema

The telemetry collector (160) ingests records keyed by ticket identifier and handshake transcript identifiers, including: cipher suites and KEMs negotiated; binder type validated; acceptance/refusal codes; SCT presence and CT log (132) responses: per-POP (722) success rates; and latency percentiles. Dashboards/export (162) expose rollups for policy gating and incident response.

Binder-Enforced Resumption Method

An example method includes: (1) negotiate a hybrid handshake combining a classical ephemeral key exchange and a post-quantum KEM: (2) derive resumption PSK secrets for each key-exchange class: (3) issue a ticket containing scope metadata (710) and binders for each class appropriate to the negotiated handshake; (4) on receiving a resumption attempt, parse scope metadata (710) and select the expected binder class from Type ID (712); (5) verify the corresponding binder and reject attempts that present an incompatible binder or omit required SCTs; (6) rotate ticket protection keys under quorum (142) and attestation (144) according to policy epoch (720).

Security Considerations

The system prevents downgrade by binding resumption to the originally negotiated key-exchange class, refusing cross-class binders. Scope metadata (710) prevents replay across identity domains (716) and policy epochs (720). Quorum (142) and attestation (144) reduce the blast radius of key-management faults. CT logging to logs (132) reduces mis-issuance risk.

Interoperability

The TLS terminator (110) remains interoperable with classical clients (170) by issuing tickets with classical binders when hybrid is unavailable. Middleboxes (180) can observe ticket lifetimes and binder class via exported telemetry without parsing confidential payloads. Certificate chains use standard extensions; SCT stapling follows conventional mechanisms.

Performance and Scalability

Preferred embodiments batch CT submissions at the certificate manager (120) and use asynchronous posting at the CT submitter (130). The TLS terminator (110) caches resumption PSK derivations and shards ticket storage across POPs (722). Ticket lifetimes and binder classes are tuned via policy controller (150), with rollouts staged by policy epoch (720).

Example Deployment Scenarios

Edge POPs (722) enable hybrid by default, while legacy data centers accept classical only. During an incident, policy epoch (720) is incremented; the TLS terminator (110) rejects tickets with prior epochs, forcing fresh hybrid negotiations. For an HSM firmware update, quorum (142) approves key unsealing only after attestation (144) validates firmware measurements.

Alternative Embodiments

In one variant, the TLS terminator (110) binds resumption to negotiated cipher suite families rather than key-exchange class. In another. Type ID (712) enumerates KEM families to fine-grain resumption acceptance. Attestation (144) may originate from a trusted platform module or enclave rather than an HSM. The certificate manager (120) may operate using offline signing with periodic key injection into the HSM cluster (140).

Best Mode

A best-mode implementation at filing employs ECDHE over P-256 combined with ML-KEM for hybrid handshakes, ML-DSA for certificate chains, AEAD-GCM for ticket payload protection, and policy epochs (720) aligned to one-hour windows per POP (722), with quorum (142) threshold of two-of-three approvers and attestation (144) based on signed platform measurements.

Industrial Applicability

The disclosed system applies to content-delivery networks, enterprise reverse proxies, and cloud API gateways requiring staged PQ migration with measurable rollback and compliance logging. The approach integrates with existing TLS infrastructure while constraining replay and downgrade risk during transition.

Application Programming Interfaces (APIs) and Data Structures

In a preferred embodiment, the TLS terminator (110) exposes control-plane APIs over mutually authenticated HTTPS. The following interfaces are exemplary and non-limiting.

Ticket Issue API

POST/v1/tickets—Request a session ticket for a given handshake transcript identifier. The server (110) derives per-class PSKs and returns an AEAD-protected ticket embedding scope metadata (710).

Request (JSON): {"transcript_id": string, "negotiated_kex": "HYBRID"|"CLASSICAL", "alpn": string, "sct_required": boolean}
Response (JSON): {"ticket_id": base64, "ticket_blob": base64, "binder_class": "PQ"|"CLASSICAL", "lifetime_s": int}

Policy Controller API

PUT/v1/policy/epoch—Set current rollout epoch (720). Body: {"epoch": uint64, "effective_at": RFC3339}.

POST/v1/policy/rules—Update enablement, minimum PQ levels, ticket lifetime ranges, and per-POP (722) overrides.

Certificate Manager API

POST/v1/certs/rotate—Propose dual-algorithm chain rotation. Body includes algorithm sets and notBefore/notAfter windows. On approval via quorum (142) and attestation (144), 120 generates precertificates and enqueues to 130.

Telemetry Export

GET/v1/telemetry/handshakes?pop= . . . &since= . . . —Returns aggregate counters, latency percentiles, binder validation outcomes, CT (132) acceptance rates, and refusal reasons.

TICKET PAYLOAD SCHEMA

| Field | Type | Len | Description | Preferred/Alternatives |
|---|---|---|---|---|
| Type ID (712) | uint8 | 1 | 0 = CLASSICAL, 1 = HYBRID, 2 = KEM-family enumerated | Prefer 1 = HYBRID; alt: KEM-family |
| Version (714) | uint8 | 1 | Schema version of scope metadata (710) | Start at 1; bump on schema change |
| Identity Domain (716) | bytes | 16-32 | Hash over cert chain or service cluster id | Prefer SHA-256/128 truncation |
| Flags/Reserved (718) | uint16 | 2 | Forward-compatibility flags; zero if unused | Bit 0: SCT required |
| Policy Epoch (720) | uint64 | 8 | Monotonic epoch for rollout/rollback binding | Optional; omit for single-site |
| POP/Site (722) | uint16 | 2 | Point-of-presence identifier | Optional; 0 = unspecified |

State Machines

Binder-Enforced Resumption (Server 110)

States: IDLE→PARSE_TICKET→SELECT_BINDER_CLASS→VERIFY_BINDER→{ACCEPT|REFUSE}. Transitions: (a) on receipt of ClientHello+PSK binder, decrypt ticket; (b) read Type ID (712); (c) if HYBRID then verify PQ binder; else verify classical binder; (d) if SCT required (flag in 718) but absent, REFUSE; (e) on success, ACCEPT and derive traffic secrets.

Rotation/Rollback (HSM 140, Quorum 142, Attestation 144)

States: PROPOSED→ATTESTING→APPROVING→ACTIVATING→ACTIVE; on error: ROLLBACK. Transitions gated by quorum (142). On attestation failure, remain in PROPOSED and alert. On activation fault, restore sealed prior handles and record audit.

ERROR HANDLING AND TELEMETRY CODES

| Code | Layer | Meaning | Telemetry Key |
|---|---|---|---|
| E_BINDER_CLASS_MISMATCH | Resume | Binder class does not match Type ID (712) | resume.err.class_mismatch |
| E_TICKET_EXPIRED | Resume | Ticket lifetime exceeded | resume.err.expired |
| E_SCT_REQUIRED | Handshake | SCT required by flags (718) but unavailable | hs.err.sct_required |

-continued

| ERROR HANDLING AND TELEMETRY CODES | | | |
|---|---|---|---|
| Code | Layer | Meaning | Telemetry Key |
| E_ATTEST_FAIL | HSM | Attestation verifier (144) failed validation | hsm.err.attest |
| E_QUORUM_DENIED | HSM | Quorum (142) did not approve | hsm.err.quorum |
| E_CT_REJECT | CT | One or more CT logs (132) rejected precertificate | ct.err.reject |

Threat Model and Mitigations

- Replay of tickets across identity domains (716): prevented by binding to 716 and rejecting mismatched domains.
- Protocol downgrade (hybrid→classical): prevented by verifying the PQ binder when Type ID (712)=HYBRID.
- Ticket theft: mitigated by AEAD protection and short lifetimes; policy controller (150) can force epoch (720) increments.
- Key-management compromise: blast radius reduced by quorum (142) and attestation (144); rollback restores sealed handles.
- CT log failure/mis-issuance: multi-log submission (130→132) with SCT stapling and refusal paths recorded in telemetry (160/162).

Example Values and Test Vectors

Illustrative values: Version (714)=1; Identity Domain (716)=SHA-256(certChain)[:16]; Policy Epoch (720)=1700000000; POP (722)=42. Ticket payload AEAD=AES-GCM-256 with 12-byte IV; binder transcript hash truncated to 32 bytes.

Compliance and Logging Requirements

Precertificate logging via 130 MUST target at least three CT logs (132); on fewer than two SCTs within policy window, the TLS terminator (110) sets refusal reason E_SCT_REQUIRED for affected handshakes and reattempts submission. Audit trails of quorum (142) and attestation (144) events are retained ≥400 days in telemetry (160) and dashboards/export (162).

| INTEROPERABILITY MATRIX<br>The following table summarizes typical behaviors across client and middlebox variants. | | | | |
|---|---|---|---|---|
| Client Capability | Middlebox | Negotiation | Ticket Issuance | Resumption Path |
| TLS1.3 + PQ KEM | Transparent | HYBRID | Ticket with Type ID (712) = HYBRID | PQ binder |
| TLS1.3 classical only | Transparent | CLASSICAL | Ticket with Type ID (712) = CLASSICAL | Classical binder |
| TLS1.3 + PQ KEM | TLS-terminating | HYBRID at 110 edge | Edge ticket, POP (722) anchored | PQ binder |
| Legacy TLS | Any | Fallback (policy) | Tickets disabled | N/A |

Performance Parameters and Configuration Ranges

Ticket lifetimes: 10-24 hours (edge 722), 1-4 hours (core); resumption window bounded by policy epoch (720).

CT batching window: 1-10 seconds at 130; retry with exponential backoff on 132 failures.

HSM concurrency: 64-256 ops/sec per module; quorum (142) approval SLA target <60 seconds; attestation (144) <5 seconds per device.

Cache sharding: consistent-hash across POPs (722); sticky resumption reduces cross-site ticket invalidation.

Example Configurations

Example A (Edge-first): HYBRID default at 110 for POPs (722); Type ID (712)=HYBRID; epoch (720) increments hourly; SCTs required (flag in 718).

Example B (Conservative): HYBRID gated per-client allowlist: CT optional: tickets short-lived: rollback auto-trigger on error E_BINDER_CLASS_MISMATCH surge.

Additional Alternative Embodiments

- Scope metadata (710) may encode a structured CBOR map instead of fixed fields; Type ID (712) can be a string enum ("HYBRID", "CLASSICAL", "KEM:ML-KEM") with Version (714) controlling interpretation.
- Binder selection may be based on a feature vector (cipher suite family, KEM strength class, certificate chain attributes) rather than a single Type ID (712).
- Attestation (144) may be provided via DAA-style anonymous credentials: quorum (142) may be threshold ECDSA/EdDSA among administrators' hardware tokens.
- CT submission (130) may be offloaded to a third-party service with SLAs: the TLS terminator (110) consumes SCTs via OCSP stapling equivalents.

Pseudocode-Binder Enforcement and Ticket Lifecycle

| Server (110) - Ticket Issuance |
|---|

```
function issue__ticket(transcript, kex__class, sct__required):
  # Derive resumption PSKs per class
  psk__classical = derive__psk(transcript, class="CLASSICAL")
  psk__pq                                        = derive__psk(transcript, class="HYBRID")
  # Build scope metadata (710)
  scope = {
    "type__id": 1 if kex__class == "HYBRID" else 0,         # (712)
    "version": 1,                                      # (714)
    "id__domain": hash__cert__or__cluster( ),              # (716)
    "flags": (1 << 0) if sct__required else 0,             # (718) bit0=SCT required
    "epoch": current__epoch( ),                           # (720)
    "pop": current__pop( )                                # (722)
  }
  binders = { }
  if kex__class == "HYBRID":
    binders["PQ"] = compute__binder(psk__pq, transcript)
  else:
    binders["CLASSICAL"] = compute__binder(psk__classical, transcript)
  payload = aead__encrypt(key=ticket__key( ), plaintext=serialize(scope), aad=transcript.id)
  return Ticket(id=random__id( ), payload=payload, binders=binders,
lifetime=policy__ticket__lifetime(scope))
```

| Server (110) - Resumption Acceptance |
|---|

```
function accept__resumption(clienthello, ticket):
  scope = aead__decrypt(key=ticket__key( ), ciphertext=ticket.payload, aad=clienthello.transcript__id)
  # Read Type ID (712) to select binder path
  if scope.type__id == 1:                          # HYBRID
    expected = "PQ"
  else:                                            # CLASSICAL
    expected = "CLASSICAL"
  if expected not in ticket.binders:
    return REFUSE("E__BINDER__CLASS__MISMATCH")
  # Check SCT requirement from flags (718)
  if (scope.flags & (1 << 0)) != 0 and not clienthello.has__sct:
    return REFUSE("E__SCT__REQUIRED")
  psk = derive__psk(clienthello.transcript, class=("HYBRID" if expected == "PQ" else
"CLASSICAL"))
  ok = verify__binder(psk, clienthello, ticket.binders[expected])
  return ACCEPT( ) if ok else REFUSE("E__BINDER__INVALID")
```

Schema Definitions—JSON and CBOR

The following normative JSON Schema describes the scope metadata (710) structure. An equivalent CBOR Data Definition Language (CDDL) mapping is provided for constrained environments.

```
{
  "$id": "urn:scope-metadata:v1",
  "type": "object",
  "properties": {
    "type__id":      { "type": "integer", "minimum": 0, "maximum": 255 },         // (712)
    "version":       { "type": "integer", "const": 1 },                          // (714)
    "id__domain": { "type": "string", "contentEncoding": "base16" },              // (716)
    "flags":       { "type": "integer", "minimum": 0, "maximum": 65535 },         // (718)
    "epoch":         { "type": "integer", "minimum": 0 },                         // (720)
    "pop":         { "type": "integer", "minimum": 0, "maximum": 65535 }          // (722)
  },
  "required":      [ "type__id", "version", "id__domain", "flags" ]
}
; CDDL equivalent
scope = {
  type__id: uint .size 1,              ; (712)
  version: 1,                          ; (714)
  id__domain: bstr,                    ; (716)
  flags: uint .size 2,                 ; (718)
```

-continued

```
  epoch: uint .size 8,                    ; (720) optional
  pop: uint .size 2                       ; (722) optional
}
```

Key Derivation and Binder Computation (Informative)

In an embodiment, binder computation uses the transcript hash of ClientHello (truncated to 32 bytes) keyed with the resumption PSK derived for the negotiated class. Distinct label strings are used for HYBRID versus CLASSICAL to prevent cross-class confusion. The resumption master secret is derived independently for each class and never mixed.

Operational Runbooks

Key Rotation (Normal)

(1) 120 proposes rotation params; (2) 144 verifies device evidence; (3) 142 collects 2-of-3 approvals; (4) 140 unseals new keys; (5) 120 logs precerts via 130→132; (6) 150 increments epoch (720) per rollout plan; (7) 110 begins issuing tickets bound to the new epoch.

Rollback (Controlled)

(1) 150 increments epoch (720) to next value and sets 'allow_hybrid=false'; (2) 110 refuses resumption for prior epochs, forcing fresh handshakes; (3) 140 restores prior key handles; (4) 160/162 validate traffic recovery within SLO.

Incident Response (Binder Mismatch Surge)

Trigger when 'resume.err.class_mismatch' rate exceeds threshold over 5 minutes. Actions: freeze rotations; force epoch increment; enable verbose handshake logging; validate CT SCT availability; notify security for anomaly triage.

Conformance Tests and Acceptance Criteria

- CT-Required Path: With 718 bit0 set, server refuses resumption lacking stapled SCTs; telemetry shows E_SCT_REQUIRED with rate <0.1% after 15 minutes of CT recovery.
- Cross-Class Replay: A ticket issued under HYBRID (712=1) must be refused if only a CLASSICAL binder is presented (E_BINDER_CLASS_MISMATCH).
- Epoch Rollback: After epoch (720) increment, prior-epoch tickets are refused across all POPs (722) within 2 minutes.
- POP Isolation: A ticket anchored to POP (722)=42 is refused at POP 17 unless policy enables cross-POP resumption.
- Attestation Gate: Rotation activation blocked when 144 reports non-approved firmware measurement.

Example Handshake Transcript and Ticket Encoding (Illustrative)

Transcript excerpt: ClientHello: groups=[x25519, mlkem768], sig_algs=[ecdsa_secp256r1_sha256, ml_dsa_65], alpn=h2. ServerHello selects hybrid; EncryptedExtensions indicates SCT required; Certificate carries dual-algorithm chain.

ticket_id: 5f1c7a2b1e9d4c83
scope: {"type_id":1, "version":1, "id_domain":"7A . . . 2F","flags":1, "epoch":1700000000, "pop":42}
payload: 01 01 10 7A . . . 2F 00 01 65 CD EA 00 2A
binders: PQ: 9c7b35 . . . cd
lifetime: 21600

PARAMETER RANGES AND TRADE-OFFS

| Parameter | Range | Effect | Guidance |
|---|---|---|---|
| Ticket Lifetime | 1-24 h | Longer increases convenience; raises replay window | Edge: 10-24 h; Core: 1-4 h |
| Epoch Interval | 15 min-24 h | Shorter speeds rollback but increases churn | Start 1 h; shorten during incidents |
| CT Batching | 1-10 s | Smaller improves freshness; higher CT load | 2-5 s steady state |
| HSM Approval Threshold (142) | ⅔-⅗ | Higher reduces risk; slows rotation | ⅔ for dev; ⅗ for prod |
| POP Ticket Scope (722) | off/per-cluster/per-POP | Narrow scope stops cross-site replay | Per-POP for edge |

Scalability and SLO Targets

Let λ be handshake rate per POP (722). Ticket storage shards N, with per-shard capacity C. Ensure λ·p_resume<N·C to avoid hot shards, where p_resume is resumption probability. HSM signing throughput T_sign must exceed certificate rotation demand by a factor ≥3× during burst windows.

Edge Cases and Interoperability Failures

- Clients presenting malformed PQ extensions must negotiate CLASSICAL or fail; tickets not issued unless policy permits fallback.
- Middleboxes that strip ALPN cause resumption refusal if policy binds tickets to ALPN; flag via resume.err.alpn_mismatch.
- Clock skew >Δ between POPs (722) may cause premature E_TICKET_EXPIRED; enforce NTP hardening.

CT logs (132) under maintenance: temporarily unrequire SCTs via policy flip, then re-enable once healthy.

Further Alternative Embodiments

- Tickets may encode multiple binder classes simultaneously (e.g., PQ and CLASSICAL) with server policy selecting which to validate first.
- Scope metadata (710) may be extended with a per-device attestation hash enabling device-bound resumption.
- The policy controller (150) can compute per-POP (722) epoch offsets to stagger rollout and reduce global blast radius.
- Certificate stapling can include OCSP multi-staple equivalents where supported to reduce outbound fetches.

Appendix—Operational Notes

This appendix consolidates operational guidance for the disclosed system, including privacy controls, audit trails, and change-management steps consistent with the embodiments above.

Change windows align with epoch (720) boundaries. Rollouts SHOULD stagger across POPs (722) to minimize simultaneous refusals.

Reference Implementation Sketch

A reference implementation partitions the system into services mapped to the components described above. A front-end proxy forms the TLS terminator (110). A control daemon communicates with the policy controller (150) and certificate manager (120). Keys are accessed via a thin client binding to the HSM cluster (140), which performs AEAD and signing operations after quorum (142) and attestation (144) gates are satisfied.

The reference code organizes handshake hooks into pre- and post-negotiation callbacks. Pre-negotiation selects cipher/KEM sets and ALPN. Post-negotiation derives per-class PSKs, computes binders, and emits telemetry (160). Resumption callbacks parse tickets, evaluate policy epoch (720), check the SCT requirement in flags (718), and verify the expected binder class based on Type ID (712).

Comparative Analysis

Conventional deployments of TLS resumption typically treat tickets as class-agnostic, validating a single binder regardless of the original key-exchange mode. The disclosed approach binds resumption to the negotiated key-exchange class, refusing a mismatch. This semantics reduces exposure to downgrade and cross-context replay during post-quantum migration while remaining compatible with classical clients (170).

Existing systems may rely on coarse global toggles to disable resumption during incidents. By contrast, policy epochs (720) provide scoped, monotonic control that forces fresh handshakes only when required, and only for the affected scope (e.g., a POP (722) or service cluster). This confines blast radius and shortens recovery time without sacrificing security objectives.

Lemma Sketches

Lemma 1 (Class Separation). Assume distinct resumption PSKs for HYBRID and CLASSICAL are derived from disjoint labels and that binders are MACs over the transcript. Then any cross-class replay is rejected under unforgeability of the MAC. The proof follows by reduction: a successful cross-class replay implies forging a MAC under the wrong key with non-negligible probability, contradicting the MAC's security.

Lemma 2 (Scope Isolation). If acceptance requires equality on Identity Domain (716), Policy Epoch (720), and optional POP (722), then replay across domains, epochs, or POPs is rejected deterministically. This follows from exact-match checks on authenticated metadata.

Lemma 3 (SCT Enforcement). If the SCT-required flag in (718) is set and acceptance checks for stapled SCTs, then mis-issuance risk is reduced to the probability that all configured CT logs fail simultaneously or adversarially provide valid SCTs for unauthorized chains.

Compatibility With TLS Data Flows

The disclosed embodiments preserve standard TLS data flows. Ticket payloads are opaque to clients: servers treat tickets as AEAD-protected envelopes that encode scope metadata (710). Binder verification uses the standard binder field carried in the ClientHello PSK extension. SCT stapling, when required, is conveyed in the EncryptedExtensions or Certificate message according to typical practice.

Middleboxes (180) that are transparent at the record layer do not need modifications. TLS-terminating intermediaries can adopt the same semantics by acting as servers to clients and as clients to upstream services, propagating policy epochs (720) and binding tickets to local identity domains (716).

Deployment Playbooks

Greenfield: (1) Stand up 140 with attested firmware and enroll quorum (142); (2) Deploy 120 and generate dual-algorithm chains: (3) Enable SCT submission via 130 to logs (132); (4) Configure 150 with epoch (720) cadence and POP (722) identifiers; (5) Roll out 110 with binder-enforced resumption enabled; (6) Ramp hybrid enablement by POP while monitoring refusal rates; (7) Tune ticket lifetimes and cache sharding.

Brownfield: (1) Map existing certificate authorities and ticket keys into 140; (2) Introduce policy epochs (720) at value 0 with tickets scoped to current behavior; (3) Activate CT logging gradually; (4) Enable hybrid on a canary POP (722) and validate telemetry; (5) Enforce class binding for resumption; (6) Iterate until all POPs converge; (7) Decommission legacy resumption paths.

Monitoring and Alerting

Operators SHOULD alert on: (a) spikes of E_BINDER_CLASS_MISMATCH; (b) surges of E_SCT_REQUIRED; (c) increases in resumption refusal exceeding thresholds; (d) HSM attestation (144) failures; (e) quorum (142) denial events; and (f) CT rejection rates. Dashboards (162) display per-POP (722) success rates, latency percentiles, and key-rotation timelines aligned with epoch (720) changes.

Supplemental Test Vectors

Vector A (Classical): type_id=0, version=1, id_domain=H, flags=0, epoch=E, pop=P; binder=CLASSICAL; expected ACCEPT.

Vector B (Hybrid): type_id=1, version=1, id_domain=H, flags=1, epoch=E, pop=P; binder=PQ with SCT present; expected ACCEPT.

Vector C (Mismatch): type_id=1 (HYBRID) with only CLASSICAL binder; expected REFUSE with E_BINDER_CLASS_MISMATCH.

Vector D (Old Epoch): type_id=0, epoch=E-1 while server epoch=E: expected REFUSE.

Client-Side Behavior and Fallbacks

Clients (170) that negotiate hybrid handshakes cache ticket lifetimes and SCT requirements observed from servers. When resumption is refused due to policy epoch (720) or POP (722) scope mismatch, clients retry with a fresh handshake and cache the new scope metadata (710). For constrained devices, a classical-only profile omits PQ KEMs and accepts classical binders; the server (110) enforces semantics to avoid cross-class acceptance.

To minimize latency, clients MAY prefetch OCSP/CT artifacts when a server signals SCT requirements via extensions. Clients SHOULD expose telemetry to operators for PQ readiness including KEM preference lists, binder outcomes, and failure codes.

HSM Audit Trails and Attestation Evidence

The HSM cluster (140) produces signed audit records for key creation, import, rotation, and destruction events, including the approvers satisfying quorum (142), firmware measurement hashes checked by attestation (144), and key identifiers. These records are exported to telemetry (160) and rendered in dashboards (162).

Attestation evidence includes nonce-bound quotes, measurement register values, firmware identifiers, and policy digests. Acceptance criteria require matches to a preapproved allowlist hosted by the policy controller (150). Failed attestation blocks key activation and triggers incident response.

Formalization of Scope Matching

Let S be the set of tuples (type_id (712), id_domain (716), epoch (720), pop (722)). The acceptance function A (ticket, server_state) returns true iff all non-null coordinates in the ticket's scope equal the corresponding coordinates in server_state and the binder class equals the function of type_id. This yields a simple, decidable policy with deterministic refusal on mismatches.

Tuning Guidelines

Start with short ticket lifetimes and aggressive epoch cadence during initial migration, then lengthen lifetimes and relax cadence as refusal rates stabilize. Calibrate SCT requirements to CT health; when logs (132) are healthy, require SCTs via flag (718). During periods of degraded CT availability, temporarily disable the flag and monitor E_CT_REJECT.

Cache sharding should align with POP (722) boundaries to favor locality while allowing spillover during traffic spikes. Resumption acceptance ratios >85% significantly amortize hybrid handshake cost.

Additional Edge Cases

If middleboxes (180) rewrite ClientHello extensions, servers may receive malformed binder lists; enforce strict parsing and surface E_BINDER_INVALID. In case of extreme clock drift among sites, epoch (720) convergence must be enforced by the policy controller (150).

Reference Build Options

Build-time switches include: enabling/disabling hybrid by default, selecting KEM and signature families, AEAD cipher choice for ticket payloads, and enabling POP (722) scoping. Runtime toggles include SCT requirement, epoch (720) increments, and per-POP overrides.

Security Considerations (Extended)

The system's security depends on uniqueness of resumption PSKs per class, confidentiality and integrity of ticket payloads, sound binder implementation, and correct enforcement of scope matching. The attack surface includes ticket theft, CT log compromise, and HSM misconfiguration, each mitigated by explicit controls described herein.

Future-Proofing

Version (714) enables new KEM families or binder constructions without invalidating existing tickets. Policy epochs (720) act as feature flags for controlled rollouts. Scope metadata (710) may include capability bits to guide clients in multi-algorithm settings.

The invention claimed is:

1. A transport layer security (TLS) migration system comprising a policy controller, a telemetry collector, and a TLS-terminating intermediary configured to act as a TLS client when communicating with an upstream service, wherein:

the policy controller is configured to maintain, for a first scope, a rollout rule specifying a staged rollout sequence comprising at least a first staged rollout state and a later staged rollout state;

the TLS-terminating intermediary is configured, while the first scope is operated in the first staged rollout state according to the rollout rule and when initiating one or more upstream TLS connections, to include, in a ClientHello message, key-share information for a hybrid key exchange comprising X25519 and ML-KEM-768, in which X25519 provides a classical ephemeral key agreement and ML-KEM-768 provides a post-quantum key-encapsulation mechanism (KEM) contribution to traffic-secret derivation;

the telemetry collector is configured to collect, from upstream TLS connections initiated while the first scope is operated in the first staged rollout state, TLS-handshake telemetry comprising a handshake-result metric for the first scope;

wherein the rollout rule further specifies a minimum post-quantum security level and fallback behavior; and the policy controller is configured to determine whether the handshake-result metric satisfies a rollout criterion and:

responsive to the handshake-result metric satisfying the rollout criterion, cause the first scope to advance, according to the rollout rule, from the first staged rollout state to the later staged rollout state; and responsive to the handshake-result metric not satisfying the rollout criterion, disable application of the rollout rule for the first scope.

2. The system of claim 1, wherein the TLS-terminating intermediary comprises a proxy, a load balancer, or a content-delivery-network edge module deployed at a point of presence.

3. The system of claim 1, wherein the rollout rule specifies a minimum post-quantum security level requiring ML-KEM-768.

4. The system of claim 1, wherein the first scope comprises a point of presence or a service cluster.

5. The system of claim 1, wherein the rollout criterion comprises an error-budget criterion or a service-level-objective criterion.

6. The system of claim 1, wherein the first staged rollout state and the later staged rollout state are selected from shadow, allow, and require modes, and wherein the TLS-handshake telemetry further comprises a hybrid-handshake ratio, resumption success broken down by binder type, and a downgrade-detection rate that gate a transition to the require mode.

7. The system of claim 1, wherein:

the TLS-terminating intermediary is further configured to act as a TLS server when communicating with a client and, while the rollout rule is in effect, to issue a session ticket bound to authenticated scope metadata identifying a first policy epoch of the first scope;

the policy controller is configured, when disabling application of the rollout rule for the first scope, to increment the policy epoch from the first policy epoch to a second policy epoch and to distribute the second policy epoch to the TLS-terminating intermediary; and the TLS-terminating intermediary is configured, after receiving the second policy epoch, to refuse resumption using the session ticket based on the first policy epoch preceding the second policy epoch, thereby forcing a fresh TLS handshake.

8. A computer-implemented method performed by a transport layer security (TLS) terminator at a distributed site, the method comprising:

receiving, from a policy controller, a rollout rule that, for a first scope associated with the TLS terminator, enables hybrid handshakes and specifies a current policy epoch;

while the rollout rule is in effect and when acting as a TLS client communicating with an upstream service, initiating an upstream TLS connection by sending a ClientHello message comprising key-share information for a hybrid key exchange comprising X25519 and ML-KEM-768, wherein both X25519 and ML-KEM-768 contribute cryptographic material to traffic-secret derivation;

while the rollout rule is in effect and when acting as a TLS server communicating with a downstream client, completing a TLS handshake in which a traffic secret depends on both a classical ephemeral key agreement and a post-quantum key-encapsulation mechanism (KEM), and issuing a session ticket bound to authenticated scope metadata that identifies the current policy epoch and a hybrid key-exchange class;

receiving, from the policy controller, an update to the rollout rule that disables application of the rollout rule for the first scope and specifies an incremented policy epoch;

wherein the first scope comprises a point of presence or a service cluster, and applying the incremented policy epoch to force fresh TLS handshakes is limited to session tickets whose authenticated scope metadata identifies the first scope;

receiving a resumption attempt that includes the session ticket;

determining that the current policy epoch identified by the session ticket precedes the incremented policy epoch; and based on the determining, refusing resumption using the session ticket and forcing a fresh TLS handshake.

9. The method of claim 8, wherein the authenticated scope metadata is included in an AEAD-protected payload of the session ticket and further identifies an identity domain and a point-of-presence or site identifier.

10. The method of claim 8, further comprising transmitting, to a telemetry collector, a record keyed by a ticket identifier and a handshake transcript identifier and comprising a resumption-refusal code.

* * * * *